Sept. 24, 1957　　　H. J. QUALHEIM　　　2,807,302
VEGETABLE SLICING MACHINE
Filed Jan. 10, 1955　　　　　　　　　　　　3 Sheets-Sheet 1
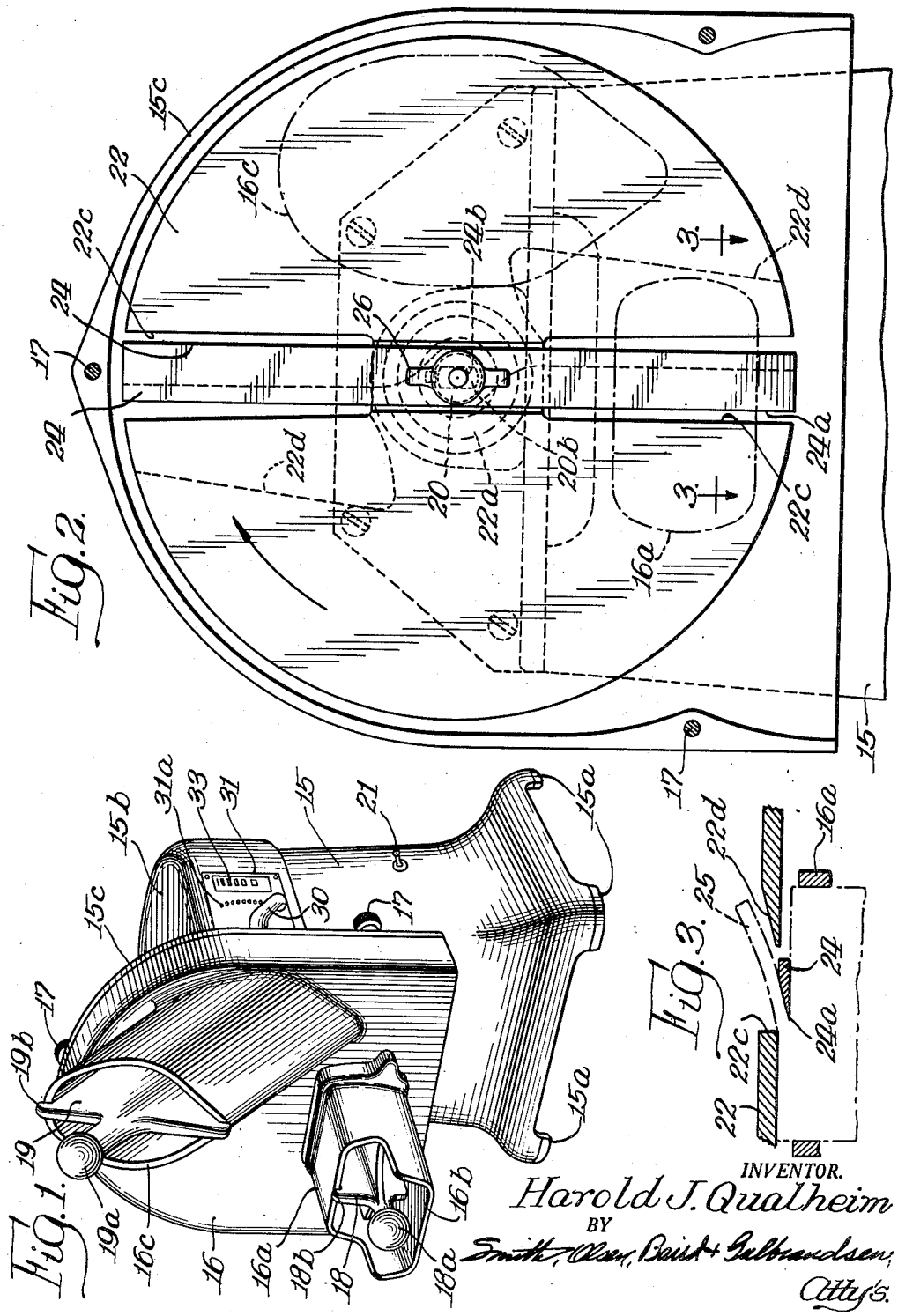
INVENTOR.
Harold J. Qualheim
BY
Smith, Olsen, Baird + Galbrandsen
Atty's.

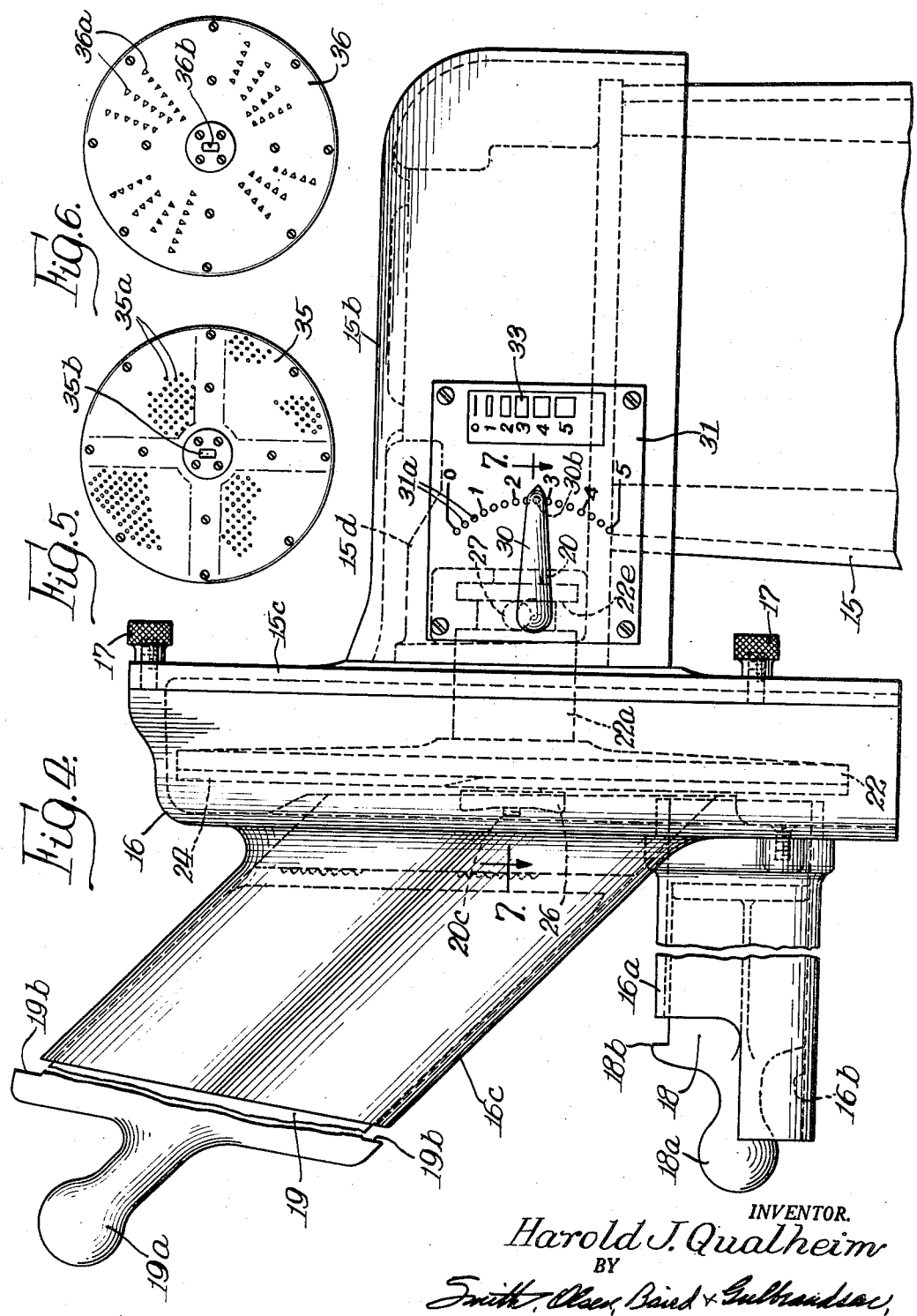

Sept. 24, 1957 H. J. QUALHEIM 2,807,302
VEGETABLE SLICING MACHINE
Filed Jan. 10, 1955 3 Sheets-Sheet 3
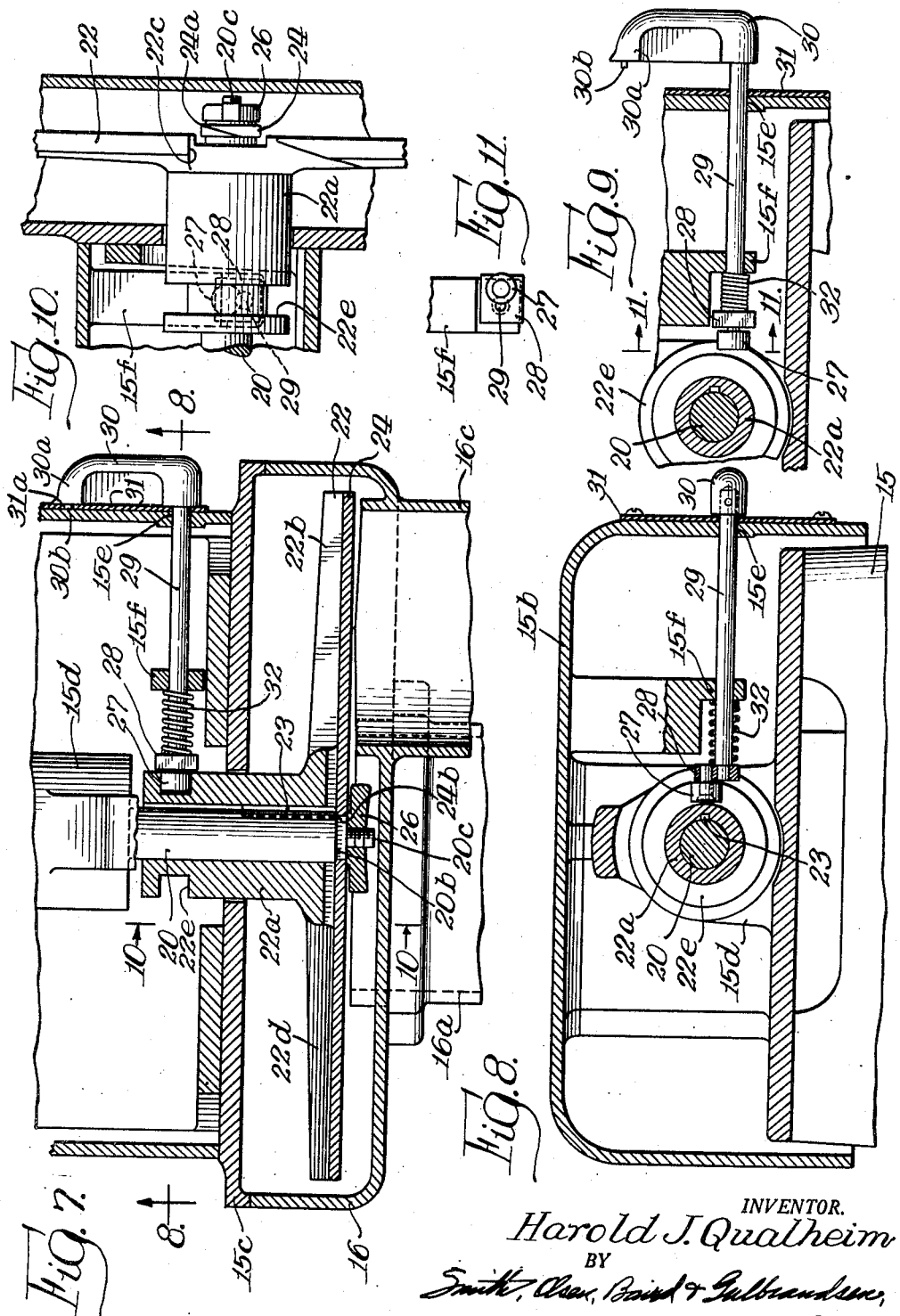
INVENTOR.
Harold J. Qualheim
BY
Smith, Olsen, Baird & Gulbrandsen,
Atty's.

United States Patent Office 2,807,302
Patented Sept. 24, 1957

2,807,302

VEGETABLE SLICING MACHINE

Harold J. Qualheim, Racine, Wis., assignor to Qualheim, Inc., Racine, Wis., a corporation of Wisconsin Application January 10, 1955, Serial No. 480,735

2 Claims. (Cl. 146—115)

This invention relates to vegetable slicing machines and its purpose is to provide an improved and simplified machine which may be economically manufactured and which may be conveniently operated for slicing vegetables and the like and also for grating and shredding them.

The principal object of the invention is to provide an improved slicing machine capable of slicing vegetables and the like and of producing slices of various thicknesses and shapes. A further object of the invention is to provide a vegetable slicer having means for permitting vegetables to be fed along different selected channels to the slicing means. Another object of the invention is to provide an improved slicing machine comprising a rotary slicing blade and a plate or disk which moves with the blade and which is capable of relative adjustment with respect to the blade for the purpose of varynig the thicknesses of the slices which are produced by slicing an article pressed against the disk. Still another object of the invention is to provide an improved vegetable treating machine comprising rotary slicing, grating and shredding devices which are interchangeable with each other. Other objects relate to various features of construction and arrangement which will appear more fully hereinafter.

The nature of the invention will be understood from the following specification taken with the accompanying drawings in which one embodiment is illustrated. In the drawings:

Figure 1 shows a perspective view of a slicing machine embodying the features of the present invention;

Fig. 2 shows an enlarged end elevation of the upper portion of the machine illustrated in Fig. 1;

Fig. 3 shows an enlarged section taken transversely on the line 3—3 of Fig. 2 through a portion of the cutting blade and adjacent portions of the rotary disk illustrating the manner in which the vegetable is sliced by the blade and the slices projected through the slot in the disk;

Fig. 4 shows an enlarged side elevation of the slicing machine illustrated in Fig. 1;

Fig. 5 shows an elevation of a rotary disk which may be substituted for the disk shown in Figs. 1 to 4, inclusive, for grating a vegetable;

Fig. 6 shows an elevation of a disk which may be substituted for that in Figs. 1 to 4, inclusive, for shredding a vegetable;

Fig. 7 shows an enlarged horizontal section taken on the line 7—7 of Fig. 4;

Fig. 8 shows a horizontal section taken on the line 8—8 of Fig. 7;

Fig. 9 is a view similar to the right-hand portion of Fig. 8 showing the relative positions of the parts when the operating shaft for adjusting the position of the disk has been retracted to permit the removal of the disk;

Fig. 10 shows a sectional view taken on the line 10—10 of Fig. 7; and

Fig. 11 shows a sectional view taken on the line 11—11 of Fig. 9.

As illustrated in the drawings, the invention is embodied in a machine comprising a hollow metal casing 15 having an outwardly flared base portion provided with legs 15a adapted to rest upon a table or other support. The body portion of this casing has a general rectangular cross section and it is closed at the top by a top wall 15b. The casing is provided on its forward side with an opening bounded by a metal plate or flange 15c to which there is secured an auxiliary casing 16 by means of the threaded studs 17. The auxiliary casing 16 comprises a pair of chutes through which the vegetables are adapted to be pushed into the machine and into engagement with the slicing mechanism. One of these chutes 16a is of a general rectangular cross section and extends outwardly in a horizontal direction from the vertical face of the auxiliary casing. Its lower wall 16b extends outwardly beyond the other walls and this chute is adapted to receive a feeding plunger 18 having a handle 18a which may be actuated by the operator to force the vegetable through the chute and into the slicing position. The frame of the plunger 18 is provided with a projection 18b which prevents it from being inserted into the auxiliary casing 16 to a point where it would engage the slicing mechanism. The auxiliary casing 16 is also provided with a chute 16c which is inclined upwardly away from the face of the casing 16 and which has a general elliptical cross section. This casing is adapted to receive a feeding plunger 19 having a handle 19a which may be manipulated to force the vegetables downwardly in an inclined direction into engagement with the operating mechanism. The frame of this plunger is provided with projections 19b which are adapted to engage the outer edge of the chute 16c to limit the inward movement of the plunger. By the use of the plunger 19 and the chute 16c the vegetables are sliced in a diagonal direction, thus obtaining slices of greater area than those which are produced by the operation of the slicing mechanism on vegetables forced in through the chute 16a, as will appear more fully hereinafter.

The casing 15 has formed integrally therewith an internal frame structure which includes a bearing 15d in which there is journaled a horizontal shaft 20. This shaft is connected through suitable driving mechanism, not shown, with an electric motor which is mounted in the lower part of the casing 15 and connected in an electric circuit which is controlled by a switch 21.

The shaft 20 is adapted to effect the rotation of a disk 22 which has a hub 22a splined on the shaft by means of a key 23. The disk 22 extends in a radial plane and is reinforced by radially extending ribs 22b which are located at the margins of radial slots 22c which are formed in the disk and extend in opposite directions from the shaft 20. The opposite edges of the slots 22c are substantially parallel to each other and a cutting blade 24 is mounted on the shaft 20 to register with these slots as shown particularly in Fig. 2. The opposite arms of the blade 24 are of lesser width than the spaced relation of the opposite edges of the slots 22c and each arm of the blade 24 is provided with a cutting edge 24a which is tapered outwardly away from the plane of the face of the disk 22, as shown particularly in Fig. 3. One edge of each slot 22c is tapered as shown at 22d in Fig. 3. The edge which is thus tapered is that which follows the cutting edge of the blade 24 during the rotation of the shaft. With this arrangement, a vegetable forced against the face of the disk 22 by either of the feeding plungers 18 or 19 will cause the vegetable to be cut by the blade 24 to produce a slice shown by dotted lines at 25 in Fig. 3.

This slice is deflected inwardly by the inclination of the cutting edge and it may be further deflected by the tapered edge 22d of the slot in the disk so that it then drops by gravity on the inside of the disk and is discharged downwardly through the lower open end of the auxiliary casing 16 into a vessel which may be placed beneath the auxiliary casing to receive the slice.

The cutting blade 24 is provided with a central aperture 24b of rectangular cross section which fits over a projection 20b of the same cross section formed on the end of the shaft 20. A wing nut 26 engages the threaded extremity 20c of the shaft to secure the blade 24 in position. The blade 24 thus occupies a fixed relation to the rotary shaft 20 and the cutting edges of the opposite arms follow each other during the rotation of the shaft so that two slicing operations are performed during each rotation. As will be seen from an inspection of Fig. 3, the thickness of the slice 25 depends upon the spaced relation of the cutting edge 24a to the outer face of the disk 22 and this relation may be varied by adjusting the position of the disk 22 on the shaft 20. For this purpose, the hub 22a of the disk is provided with an annular groove 22e which is engaged by a roller 27 mounted upon an arm 28 secured to the inner end of an operating shaft 29. This shaft is journaled in a bearing 15e formed in the wall of the casing 15 and in another bearing 15f mounted within the chamber of the casing, as shown in Figs. 7 and 8, and it is adapted to be operated manually by a handle 30 fixed on the projecting end of this shaft. The roller 27 is fixed on the outer end of the arm 28 so that it has an eccentric relationship to the axis of the shaft 29. Thus, when the shaft 29 is rotated by the handle 30 the roller 27 operates to move the hub 22a of the disk longitudinally of the shaft, thereby adjusting the spaced relation of the disk 22 and the cutting blade 24. The handle 30 has an inturned extremity 30a provided with a projection 30b adapted to engage any one of an arcuate series of recesses 31a which are formed in a plate 31 secured to the casing 15. The projection 30b is adapted to be retained in engagement with the selected depression or recess 31a by means of a spring 32 which is mounted on the shaft 29 and located in a recess formed in the bearing 15f. This spring bears against a shoulder of the bearing and against the arm 28 so that it normally moves the handle 30 toward the plate 31 while at the same time holding the roller 27 in engagement with the groove 22e. By retracting the shaft 29 against the compression of the spring 32, the pin or projection 30b is released from the recess 31a to permit the rotation of the shaft 29 to a new position wherein the relative adjustment of the disk and the cutting blade will cut a slice of different thickness. The thickness of the slice which is formed when the pin or projection 30b is in engagement with a selected depression 31a is indicated by a series of graduations 33 formed on the plate 31 to indicate visually the exact thickness of the slices with the different adjustments.

The auxiliary casing 16 may be removed from the main casing 15 by releasing the studs 17 and, when this has been done, the cutting blade 24 may be removed by first removing the wing nut 26 by which it is secured on the shaft. After the cutting blade 24 has been removed the disk 22 may be detached by retracting the operating shaft 29 against the compression of the spring 32 in order to move the roller 27 out of engagement with the groove 22e, as shown in Fig. 9. This operation of removing the cutting blade and the disk 22 is desirable for cleaning purposes and it may also be desired to remove both of these parts when the disk 22 is to be replaced by one of the disks shown in Figs. 5 and 6. In Fig. 5 there is shown a disk 35 which is similar in its general construction to the disk 22 and which has a central aperture 35b adapted to fit over the projection 20b of the shaft. The plate of the disk 35 is continuous, however, except for the formation of punched projections 35a which may be employed to effect the grating of a vegetable when this vegetable is forced against the face of the disk by either of the feeding plungers 18 or 19. When the disk 35 is employed it is secured upon the shaft 20 in the same manner in which the cutting blade 24 is secured, by the use of the wing nut 26, and at that time the disk 22 is removed from the machine as indicated above. In a similar manner the blade 24 and the disk 22 may be removed and replaced by a single disk 36 which is secured on the shaft 20 in the same manner in which the blade 24 is normally secured and which may be employed to effect the shredding of the vegetable. This disk 36 has a central aperture 36b adapted to fit over the projection 20b of the shaft and it comprises a radial metal plate having punched therein a plurality of outwardly extending projections 36a which are arranged in radial rows and which are provided with U-shaped cutting edges adapted to effect the shredding of the vegetable as the disk is rotated by the shaft.

Although one form of the invention has been shown and described by way of illustration, it will be understood that it may be constructed in various other forms which come within the scope of the appended claims.

I claim:

1. A vegetable slicing machine comprising a casing, a rotary shaft, a radial disk having a hub splined on said shaft, said disk having a radial slot, a cutting blade fixed on said shaft and extending radially therefrom adjacent said slot, said hub having an annular groove, a second shaft extending transversely to said first named shaft, a crank for rotating said second named shaft provided with an inturned extremity secured to said second shaft with said extremity having a projection adapted to engage any one of an arcuate series of recesses formed in a plate secured on the outside surface of said casing, a roller carried by said second named shaft in eccentric relation thereto and adapted to engage said groove, resilient means tending to move said second shaft endwise to maintain said roller in engagement in said groove and also for locating said projection, said shaft and projection actuated by said resilient means for holding said crank in adjusted position in any one of said recesses formed in said plate.

2. A vegetable slicing machine comprising a casing, a rotary shaft, a radial disk having a hub splined on said shaft, said disk having a radial slot, a cutting blade fixed on said shaft and extending radially therefrom adjacent said slot, said hub having an annular groove, a second shaft extending transversely to said first named shaft, a crank for rotating said second named shaft provided with an inturned extremity secured to said second shaft with said extremity having a projection adapted to engage any one of an arcuate series of recesses formed in a plate secured on the outside surface of said casing, a roller carried by said second named shaft in eccentric relation thereto and adapted to engage said groove, resilient means tending to move said second shaft endwise to maintain said roller in engagement in said groove and also for locating said projection, said shaft and projection actuated by said resilient means for holding said crank in adjusted position in any one of said recesses formed in said plate, and means adapted for removing said cutter blade from said first mentioned shaft, effecting removal of said disk from said first mentioned shaft by retracting said second shaft against the compression of said resilient means whereby said roller may be disengaged from said groove and leaving said first mentioned shaft free to mount suitable replacement units.

References Cited in the file of this patent

UNITED STATES PATENTS

| | | |
|---|---|---|
| 1,541,501 | Hosterman et al. | July 9, 1925 |
| 2,406,107 | Quinn | Aug. 20, 1946 |
| 2,442,210 | Quinn et al. | May 25, 1948 |
| 2,510,435 | Toman | June 6, 1950 |
| 2,620,817 | Blaydes | Dec. 9, 1952 |